United States Patent [19]

Tichy et al.

[11] 4,430,932
[45] Feb. 14, 1984

[54] LIVE KNIFE ASSEMBLY

[75] Inventors: Oldrich J. Tichy, Concord; David G. Herndon, Rohnert Park, both of Calif.

[73] Assignee: Atlas Pacific Engineering Company, Emeryville, Calif.

[21] Appl. No.: 470,167

[22] Filed: Feb. 28, 1983

Related U.S. Application Data

[63] Continuation-in-part of Ser. No. 236,233, Feb. 20, 1981, abandoned.

[51] Int. Cl.³ ............................................. A23N 7/00
[52] U.S. Cl. .................................... 99/593; 99/594
[58] Field of Search ............... 99/491, 540, 541, 574, 99/584, 590, 591–599

[56] References Cited

U.S. PATENT DOCUMENTS 4,176,594 12/1979 Amstad ........................ 99/593

*Primary Examiner*—Timothy F. Simone

[57] ABSTRACT

A rotary live knife assembly includes a directionally biased shaft housing with a rotary peeling cutter mounted on a shaft within the housing, a chip breaker also mounted on the shaft and a guard on the shaft housing for adjusting the depth of cut made by the cutter into a piece of fruit during a peeling operation. The guard is positively positioned on the shaft housing relative to the direction of shaft housing bias and the guard has a peel shearing surface facing upstanding blades of the chip breaker to sever removed peelings into small pieces by a scissor-like action.

10 Claims, 6 Drawing Figures

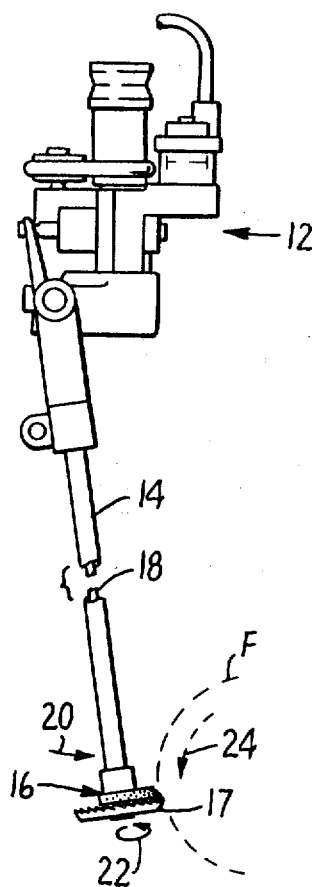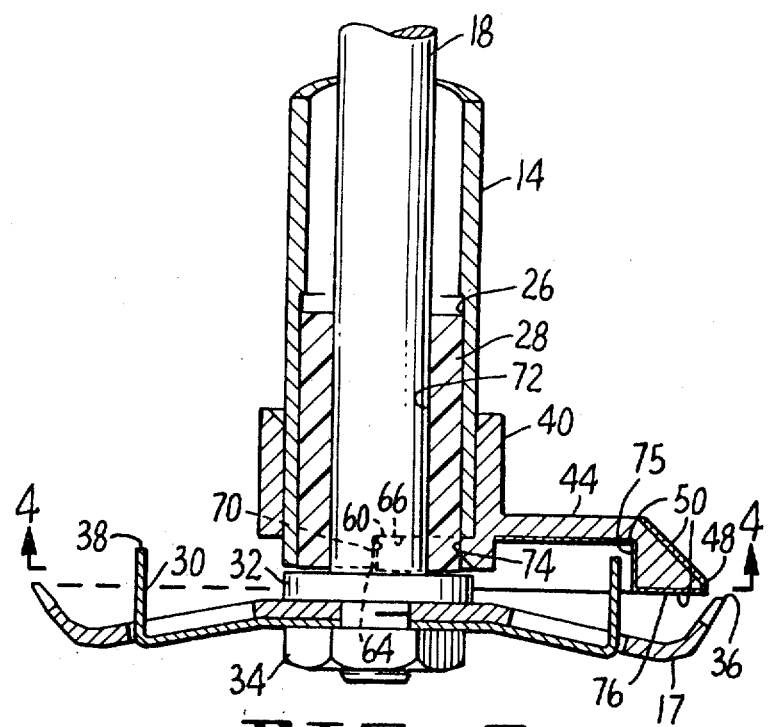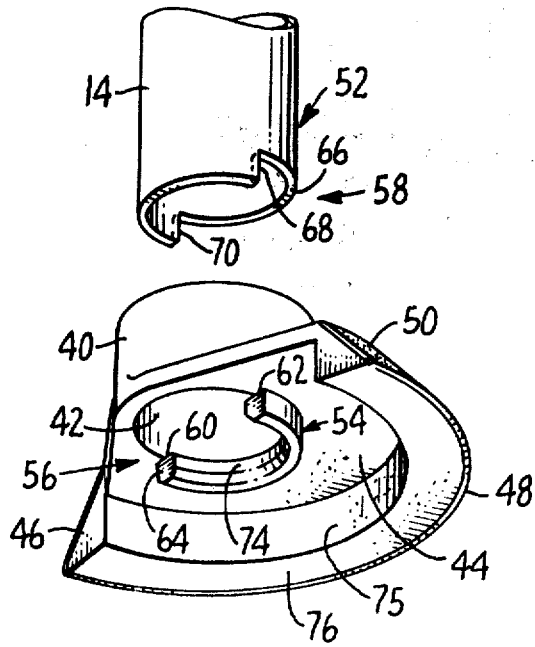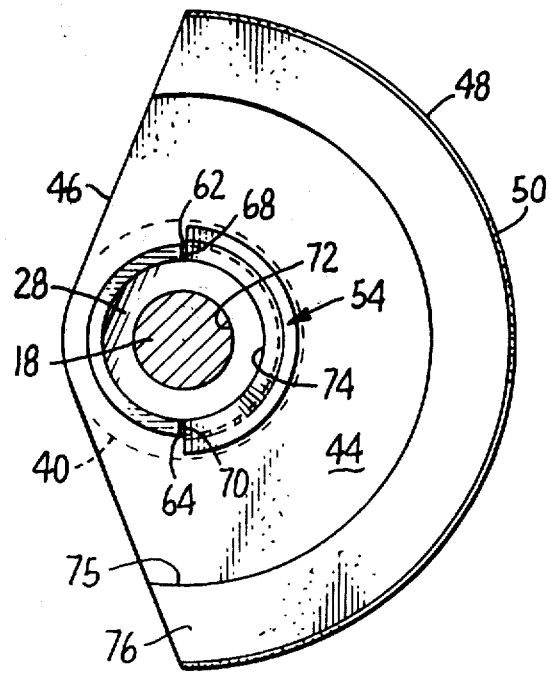

LIVE KNIFE ASSEMBLY

This invention relates generally to rotary live knife assemblies for continuously peeling fruit and, more particularly, to an assembly which provides positive orientation between the depth-of-cut-controlling guard and the direction of bias of the assembly against the fruit. The invention also provides scissor-like shearing surfaces between the guard and periodically rotating chip breaker blades to sever the fruit peel.

BACKGROUND OF THE INVENTION

Rotary live knife peelers are utilized for peeling such fruit as pears and apples. The rotary knife cutter is moved over the surface of the fruit from one end to the other while the fruit is rotated. A guard on the shaft housing assembly is held usually in directionally biased engagement with the fruit as the rotary knife cutter rotates and moves over the surface of the fruit.

Prior art rotary live knife constructions are shown in U.S. Pat. Nos. 3,058,502 (FIG. 8), 3,115,171, 3,277,941 and 4,176,594, each owned by the assignee of this invention and this application.

SUMMARY OF THE INVENTION

This invention provides a guard that in cooperation with a rotary knife cutter defines the depth of cut made by the cutter during a peeling operation. The guard is positively positioned relative to the direction of the live knife assembly bias against the rotating fruit. The invention also provides on the guard an inwardly facing peel shearing surface which in cooperation with periodically rotated upstanding blades of a chip breaker severs the peels removed from the fruit into small segments with an intermittent scissor-like shearing action.

The guard and shaft housing assembly is light in weight so that little pressure need be placed on the guard to maintain the rotary cutter in contact with the fruit as the cutter follows the contour of the fruit. The practical advantage of this is that less flesh is removed from the fruit during peeling, thereby increasing the yield of peeled fruit. Utilizing the live knife construction of this invention results in an increased yield of fruit available to the canner of about 5%.

SUMMARY OF THE INVENTION

The broad object of this invention is to provide an improved live knife assembly construction in which the guard cannot change orientation on the shaft housing and in which the weight of the guard on the end of a shaft housing is materially reduced. The rotary cutter thereby remains in contact with the fruit surface and does not skip or bounce because of irregularities in the fruit surface.

With the present invention the depth of the skin removed by the rotary cutter is so small that with pears, for example, the flesh of a peeled pear has a green tint instead of the usual white color which results when the fruit is deeply peeled.

A principal object of the invention is to provide a guard that bears on the fruit in positively fixed relation to the direction of the live knife assembly bias against the fruit surface.

One other object of the invention is to provide a scissor-like shearing action between the guard and periodically rotated chip breaker blades to sever the peels removed from the fruit into small portions.

Other objects and advantages of the invention will become apparent upon consideration of the preferred embodiments hereinafter described in connection with the accompanying drawings.

BRIEF DESCRIPTION OF THE DRAWINGS

FIG. 1 is a side elevation showing the environment in which the rotary live, knife assembly is utilized;

FIG. 2 is an exploded fragmentary view showing the construction utilized to connect one embodiment of the guard and shaft housing;

FIG. 3 is a cross section through the embodiment illustrated in FIG. 2;

FIG. 4 is an end elevation on the line 4—4 of FIG. 3 showing the relation of the guard, shaft housing and the drive shaft;

DESCRIPTION OF THE PREFERRED EMBODIMENTS

Figure 5:
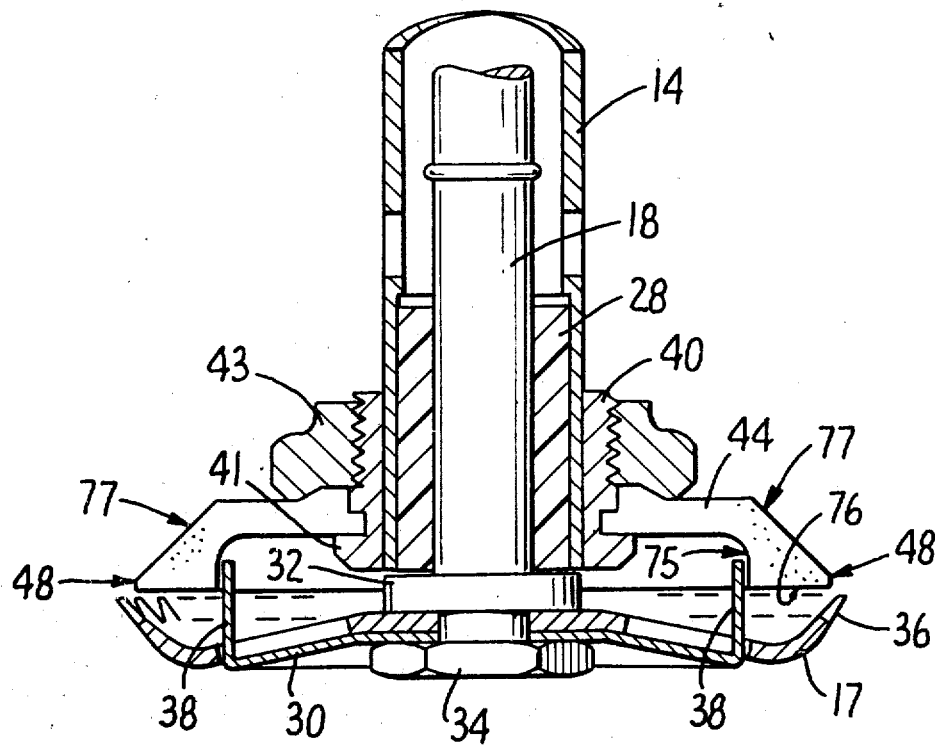
FIG. 5 is a cross-section through a second embodiment of rotary live knife construction employing a ceramic guard.

The improved live knife assembly may be used in conjunction with several of the aforementioned prior art peeling mechanisms. As shown in FIG. 1, these mechanisms generally include a drive and support structure 12 situated adjacent each fruit processing station of the machine. An elongated shaft support housing 14 is pivotally carried at 15 on the support structure 12 and carries a guard 16 mounted on the distal end thereof. The guard 16 engages the surface of the fruit F and limits the penetration of the rotary peeling cutter 17. A drive shaft 18 journalled in the shaft support housing 14 and rotated through a suitable coupling in the drive and support structure 12 extends beyond the end of the shaft support housing 14 and carries rotary cutter 17 in spaced relation to guard 16. Shaft support housing 14 is biased in the direction of arrow 20 (such as by a pneumatic piston) to keep rotary cutter 17 in contact with the surface of fruit F. The rotary cutter is rotated in the direction of arrow 22 while the fruit is rotated in the direction of arrow 24. Conventionally, the drive and support structure 12 is also moved so that the entire surface of the fruit is peeled.

As should be appreciated, the depth of peel is determined by the distance between the rotary cutter 17 and guard 16 in the direction of arrow 20. Reducing the weight carried at this distal end reduces the inertia of these members and improves the tracking characteristics of the rotary cutter and guard as these move over the surface of the fruit. This has been shown to increase the yield of the peeled fruit and allows a close guard to cutter clearance in the order of 0.10 to 0.20 inches. The shape of the guard (45° cut) reduces its weight and the reduced inertia allows the cutter to follow the irregularities on the surface of the fruit without bouncing over sections of peel or gouging into desirable fruit portions.

Figure 6:
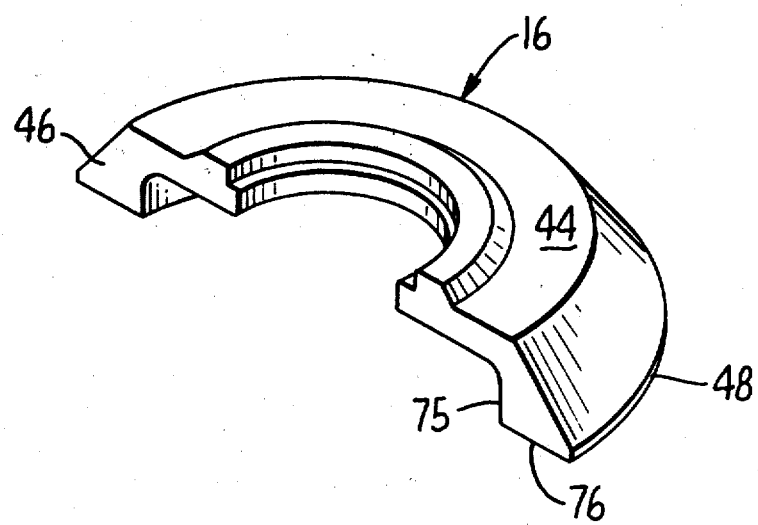
FIG. 6 is a perspective view of the guard illustrated in FIG. 5.

The improved live knife assembly uses lightweight materials (while retaining the strength) which with the 45° design shown in FIGS. 4 and 6 reduces the mass and therefore the inertia at the guard end of the shaft support housing. The shaft support housing 14 is formed from tubular aluminum having a counterbore 26 for receiving a low friction plastic bearing 28 supporting drive shaft 18. Drive shaft 18 extends beyond the end of housing 14 and carries dish-shaped rotary peeling cutter 17 and chip breaker 30 between backup washer 32 and nut 34 threaded on the end of the drive shaft 18.

Rotary cutter 17 is formed with serrated teeth 36 on its periphery which peels the fruit. Chip breaker 30 is formed with upstanding blades 38 that protrude through openings in the cutter and rotate slightly spaced from and parallel to the inwardly facing peel shearing surface 75 on the guard. The blades periodically cut the removed peel into short sections which may readily be cleared from the cutter. A ramp surface 76 adjacent to the guard rim 48 directs peel at a right angle into the chip breaker blades 38 for improved severing of the peel into the short sections that clear directionally from the knife assembly along surface 46 on the guard. The spacing between guard shearing surface 75 and blades 38 is in the order of 0.010 inch to provide a positive periodic scissors-like action between them. The described chip breaker 30 has a pair of vertical blades 38 although one or more may be used.

The construction of the prior art devices required soldering a threaded sleeve at the distal end of the shaft support housing on which the guard was attached. This soldered connection required skilled techniques to form a solid joint. As an important feature of the present invention, the connection between the shaft housing 14 and guard 16 is made in such a way that the guard will be accurately and positively positioned on the end of the shaft housing relative to the direction of its bias against the fruit. Such connection may be readily and economically assembled.

The guard 16 in the embodiment of FIGS. 2–4 is lightweight and fashioned from a unitary piece of aluminum. It has collar 40 with a bore 42 therethrough for receiving the end of the shaft housing 14. In a preferred embodiment the shaft housing is tubular and the bore is of such a diameter to the outside diameter of the tube that the guard may be press fit on the end of the shaft housing. Transverse to the collar 40 is a planar portion 44 extending at right angle to the shaft 18 over a portion of the cutter circumference so that peeling may readily be cleared from the open area defined by surface 46. The planar portions 44 of the illustrated guards in FIGS. 4 and 6 are an approximately 45° segment. The planar portion has a peripheral rim 48 surrounding planar portion 44 and extending toward cutter 17. Rim 48 forms a fruit engaging surface on the outer face thereof which rides over the surface of the fruit and forms a depth of peel guage for the cutter. These surfaces may be covered with a hard material 50 to improve wear characteristics. Hard chromium or a ceramic such as aluminum oxide are suitable wear resistant coating materials.

A coupling 52 is provided which properly positions guard 16 on the end of shaft housing 14 and prevents relative movement therebetween after assembly. This coupling is provided by a flange 54 on the guard 16 having a stepped recess 56 and by a complementing stepped recess 58 on the end of shaft housing 14. These stepped recesses, as shown in FIGS. 2, 3 and 4, have confronting surfaces that act as positioning stops. Flange 54 extends interiorly of bore 42 and has transverse surface 60 and radially extending surfaces 62 and 64. Shaft housing 14 has a cutaway portion in the end thereof which forms transverse surface 66 and radially extending surfaces 68 and 70.

As shown in FIGS. 3 and 4, when assembled, these surfaces properly position the guard 16 on the end of the shaft housing so that rim 48 will be properly positioned relative to the directional bias of the cutting edge of rotary cutter 17 on the fruit. As mentioned, shaft housing 14 has a counterbore 26 for receiving a low friction plastic bearing 28 on which shaft 18 is supported through bore 72. Flange 54 has an interior surface 74 matching counterbore 26 such that bearing 28 may be supported over its entire length.

The specific embodiment illustrated in FIGS. 5 and 6 also pivotally mounts upon a drive and support structure 12 as shown in FIG. 1. This embodiment includes also a shaft housing 14 carrying drive shaft 18 within a journal bearing 28 at its lower end for rotating the rotary cutter 17 that is secured with chip breaker 30 between backup washer 32 and nut 34 threaded on the end of the drive shaft 18. In this embodiment, the guard 16 is formed from ceramic. This has been found to provide an unusually long operating life as compared to metal or ceramic coated metal. The guard 16 mounts upon a separate hub 40' press-fit upon the end of shaft housing 14 and is secured thereon between a shoulder 41 on the hub and retaining nut 43 threaded onto the hub 40'.

The ceramic guard 16 of FIGS. 5 and 6 also includes a planar portion 44 extending transversely to the axis of drive shaft 18 and carries at its outer periphery a rim 48 that forms a fruit-engaging surface spaced from the teeth 36 of rotary cutter 17 at about 0.10 to 0.20 inches to define the depth of cut. As in the embodiment of FIGS. 2–4, the upstanding blades 38 of the chip breaker 30 periodically rotate in parallelism past the inwardly facing peel shearing surface 75 on the guard to cut with scissors-like action the severed peel into short sections. The clearance between the blades 38 and shearing surface 75 is in the order of 0.010 inches. The cut peel sections discharge along the trailing edge surface 46 on the guard. A ramp surface 76 adjacent to the peripheral rim 48 directs peel at a right angle into the chip breaker blades 38 for improved severing of the peel.

The guard 16 of FIGS. 5 and 6 also covers only a sector of the rotary cutter 17 in this embodiment of 180° as shown in FIG. 6. The guard 16 has a conical surface 77 at about 45° orientation to planar portion 44 and commencing just above the peripheral rim 48 to provide substantial clearance from the fruit surface and to reduce guard weight and inertia.

Various modifications of the described embodiments will become apparent to those familiar with rotary knife cutters for fruit processing. The described embodiments provide a positive scissor-like shearing action between overlapping chip breaker blades and an inwardly facing shearing surface on the guard which is a substantial improvement over the prior art. An improved cutting mechanism is provided which is of lighter construction and simpler design lending itself to more economical production and improved operation.

We claim:

1. In a fruit peeling mechanism which includes a shaft housing, a drive shaft rotatable within the housing and extending outwardly of the housing at one end thereof, a rotary peeling cutter mounted on the drive shaft one end for rotation with the shaft, a chip breaker mounted on the drive shaft one end and a guard mounted on the shaft housing for cooperation with the cutter for adjusting the depth of a cut made by the cutter into a piece of fruit during a peeling operation, the improvement comprising:

(a) the guard formed with a peripheral rim having an outwardly facing fruit engaging surface which cooperates with said cutter to form a depth of peel gage for said cutter and said guard also formed with an inwardly facing peel shearing surface near the rim, (b) the chip breaker having upstanding blades in parallelism with and overlapping at least a portion of said shearing surface.

2. The mechanism of claim 1 wherein said chip breaker blades extend in parallelism to the axis of chip breaker rotation and to the shearing surface of the guard whereby to achieve positive scissor-like shearing action.

3. The mechanism of claim 1 wherein said guard is provided with ramp surface adjacent the peripheral rim to direct peels toward said chip breaker blades.

4. The mechanism of claim 1 wherein the guard extends over only a segment of the rotary peeling cutter and has a discharge face to control the direction of peel discharge.

5. The mechanism of claim 1 wherein the entire guard is made of ceramic.

6. The mechanism of claim 1 wherein the guard adjacent the peripheral rim is conically shaped for fruit surface clearance.

7. In a fruit peeling mechanism which includes a directionally biased shaft housing, a drive shaft rotatable within the housing and extending outwardly of the housing at one end thereof, a rotary peeling cutter mounted on the drive shaft one end for rotation with the shaft, a chip breaker mounted on the drive shaft one end and a guard mounted on the shaft housing for cooperation with the cutter for adjusting the depth of a cut made by the cutter into a piece of fruit during a peeling operation, the improvement comprising:

(a) a unitary guard having
 (1) a collar with a bore therethrough for mounting upon the end of said shaft housing,
 (2) a planar portion transversely positioned to said bore and extending over a sector of said rotary peeling cutter,
 (3) a peripheral rim surrounding said planar portion and extending toward said cutter, said peripheral rim having a fruit engaging surface on the outer face thereof which cooperates with said cutter to form a depth of peel guage for said cutter, and
 (4) a flange portion adjacent said bore and having a stepped recess forming a coupling face;
(b) a recess on said shaft housing forming a complimentary coupling face with said stepped recess on the guard flange portion,
(c) said stepped recesses forming a positioning stop between the guard and shaft housing for positioning of said fruit engaging surface relative to the direction of shaft housing bias.

8. The mechanism of claim 7 and wherein said flange portion of said guard extends at least partially interiorally of said bore to form an arcuate stop for said shaft housing, said arcuate stop having a transverse surface and also having radially extending surfaces, said shaft housing having complementary confronting surfaces to said transverse surface and said radial surfaces and adapted to limit the longitudinal placement of said guard on said housing and also prevent rotational movement of said guard on said housing.

9. The mechanism of claim 7 and wherein said shaft housing has a bore therethrough for receiving said drive shaft of said rotary peeling knife, said guard flange has an arcuate interior surface coextensive to said shaft housing bore, and a bearing fitting within said shaft housing bore and said arcuate surface and having a bore therethrough for receiving said knife shaft and providing support therefor through said housing and guard flange.

10. The mechanism of claim 7 and wherein said guard is made from aluminum and said fruit engaging surface includes at least a hard surface covering.

* * * * *